United States Patent [19]

Dietzsch

[11] 4,373,665
[45] Feb. 15, 1983

[54] DEFORMABLE LIGHT-WEIGHT HOUSING STRUCTURE

[75] Inventor: Kurt Dietzsch, Leonberg-Eltingen, Fed. Rep. of Germany

[73] Assignee: Sueddeutsche Kuehlerfabrik Julius Fr. Behr GmbH & Co. KG, Stuttgart, Fed. Rep. of Germany

[21] Appl. No.: 105,498

[22] Filed: Dec. 20, 1979

[30] Foreign Application Priority Data

Dec. 23, 1978 [DE] Fed. Rep. of Germany ....... 2856031

[51] Int. Cl.³ .......................... B62D 25/00; B60H 1/02
[52] U.S. Cl. ............................... 237/12.3 A; 296/189;
180/90; 280/752; 98/2.05; 425/542
[58] Field of Search .............. 98/2.05, 2; 237/12.3 A; 280/752; 296/28 R, 189; 180/90; 425/542

[56] References Cited

U.S. PATENT DOCUMENTS

| | | | |
|---|---|---|---|
| 3,170,509 | 2/1965 | Dee Rees et al. | 237/12.3 A |
| 3,806,154 | 4/1974 | Akiyama | 280/752 |
| 3,831,997 | 8/1974 | Myers | 296/189 |
| 3,834,482 | 9/1974 | Wada et al. | 280/752 |
| 3,861,711 | 1/1975 | Terry et al. | 280/150 B |

FOREIGN PATENT DOCUMENTS

| | | | |
|---|---|---|---|
| 1093020 | 11/1967 | United Kingdom | 296/189 |
| 1160879 | 8/1969 | United Kingdom | 296/189 |
| 1550436 | 8/1979 | United Kingdom | 296/189 |

*Primary Examiner*—Albert J. Makay
*Assistant Examiner*—Henry Bennett
*Attorney, Agent, or Firm*—Schwartz, Jeffery, Schwaab, Mack, Blumenthal & Koch

[57] ABSTRACT

Disclosed is a light-weight deformable housing structure suitable for use as a collapsing component in a vehicle comprising a load-bearing lattice structure having a predetermined axis of collapse and a non-load-bearing skin enclosing the lattice structure. Also disclosed is a heater unit for a vehicle including a heater and a housing according to the invention surrounding the heater.

7 Claims, 5 Drawing Figures

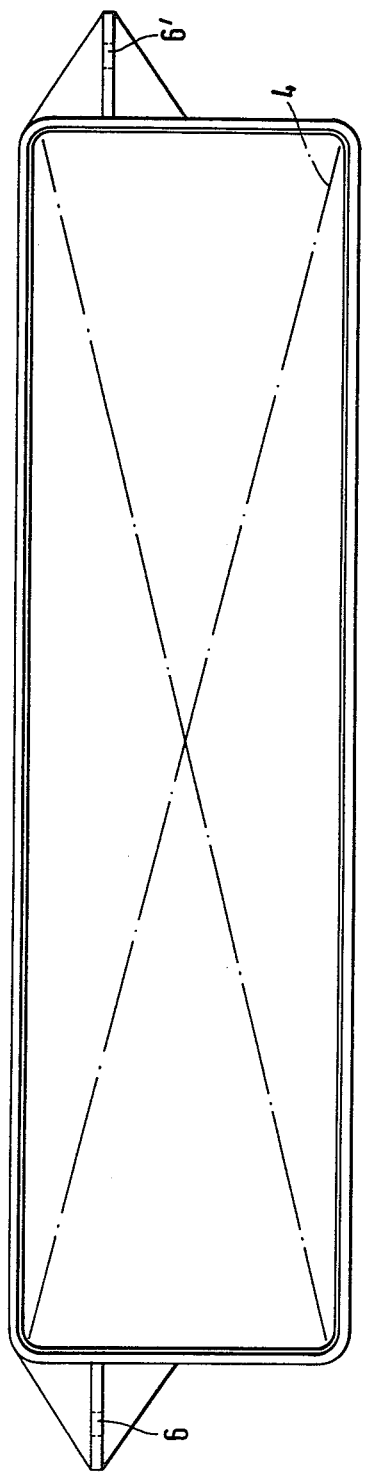
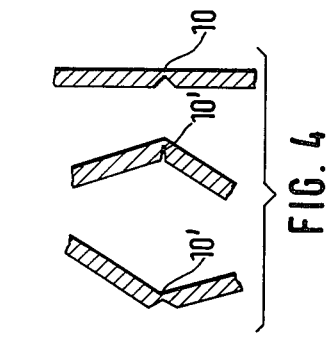
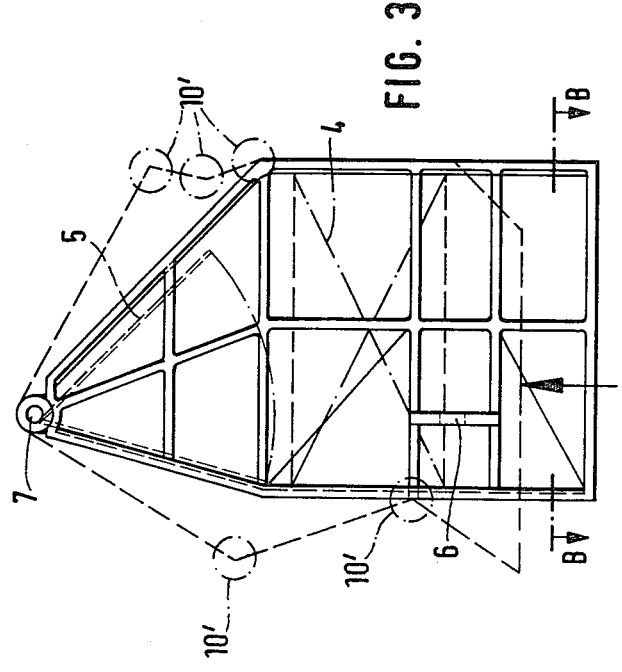
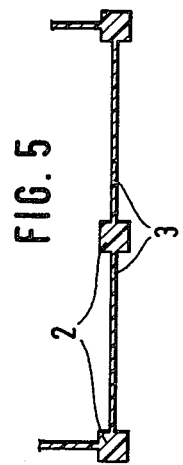

DEFORMABLE LIGHT-WEIGHT HOUSING STRUCTURE

BACKGROUND OF THE INVENTION

The present invention pertains to a deformable housing structure of light-weight construction, preferably for use as a housing for a heater in automotive vehicles.

In today's automotive vehicles, not only the chassis and the vehicle body, but also other structural parts, such as, for example, the housing for the heater must be designed so that it will be capable of absorbing by deformation the inertia forces generated in the case of a collision, in order to reduce the danger to the occupants of the vehicle. The heater housing usually is found beneath the dashboard in the vehicle and would be pushed by the engine, in case of an impact, into the passenger compartment and injure the occupants thereof. Attempts are, therefore, being made today in the design of heater housings to render them deformable, a result which, in the case of the presently known heater housings, has not yet been achieved, or only to an inadequate degree. Thus, conventional heater housings are for the most part made of synthetic plastic materials, usually with an overall constant wall thickness. Such a structure is not capable of deformation in case of an impact, i.e., of collapsing, because it is inherently too rigid. Furthermore, another requirement of modern vehicle design at the present time consists of the need to save weight in all areas, because this results in a reduction of operating costs. This requirement also affects the heating and air conditioning devices of automotive vehicles.

SUMMARY OF THE INVENTION

It is, therefore, an object of the present invention to provide an improved, light-weight deformable housing structure.

Another object of the invention resides in the provision of a housing which is capable of absorbing deformations caused by abruptly appearing mass forces and which additionally has a low structural weight.

In particular, it is an object of the invention to provide such a housing so that, in the case of an impact, it will become shorter in the direction of the forces acting on it.

It is a specific object of the invention to provide a light-weight deformable housing for use in an automotive heating or cooling system.

In accomplishing the foregoing objects, there has been provided in accordance with the present invention a light-weight deformable housing structure suitable for use as a collapsing component in a vehicle, comprising a load-bearing lattice structure having a predetermined axis of collapse and a non-load-bearing skin enclosing the lattice structure. In one embodiment, the lattice structure comprises a separate structure to which the skin is attached, wherein the lattice structure is preferably produced by stamping from a flat sheet. In another embodiment, the lattice structure and said skin are integrally formed, preferably by injection molding from a synthetic resinous material. Most preferably, the lattice structure comprises a plurality of points of intended collapse comprising points of weakened cross-section at predetermined locations.

In accordance with another aspect of the present invention, there has been provided a heater unit for attachment to the body of a vehicle comprising a heater and a housing formed around the heater. The housing comprises a light-weight deformable housing structure comprising a load-bearing lattice structure having a predetermined axis of collapse, means for attaching the lattice structure to the body of the vehicle so that the axis of collapse coincides substantially with the longitudinal axis of the vehicle, and a non-load-bearing skin enclosing the lattice structure. The heater unit further comprises at least one air inlet into the housing and at least one warm air outlet from the housing.

Further objects, features and advantages of the present invention will become apparent to a person of ordinary skill in the art from the detailed description of preferred embodiments which follows, when considered in light of the attached figures of drawings.

BRIEF DESCRIPTION OF THE DRAWINGS

In the drawings:

FIG. 2 is a bottom view of the housing according to the invention;

FIG. 3 is a side elevation view of the housing according to the invention;

FIG. 4 is an isolated cross-section through several of the intended points of fracture in the housing structure; and FIG. 5 is a partial section through the structure of the housing taken along the line B—B in FIG. 3.

DETAILED DESCRIPTION OF PREFERRED EMBODIMENTS

Figure 1:
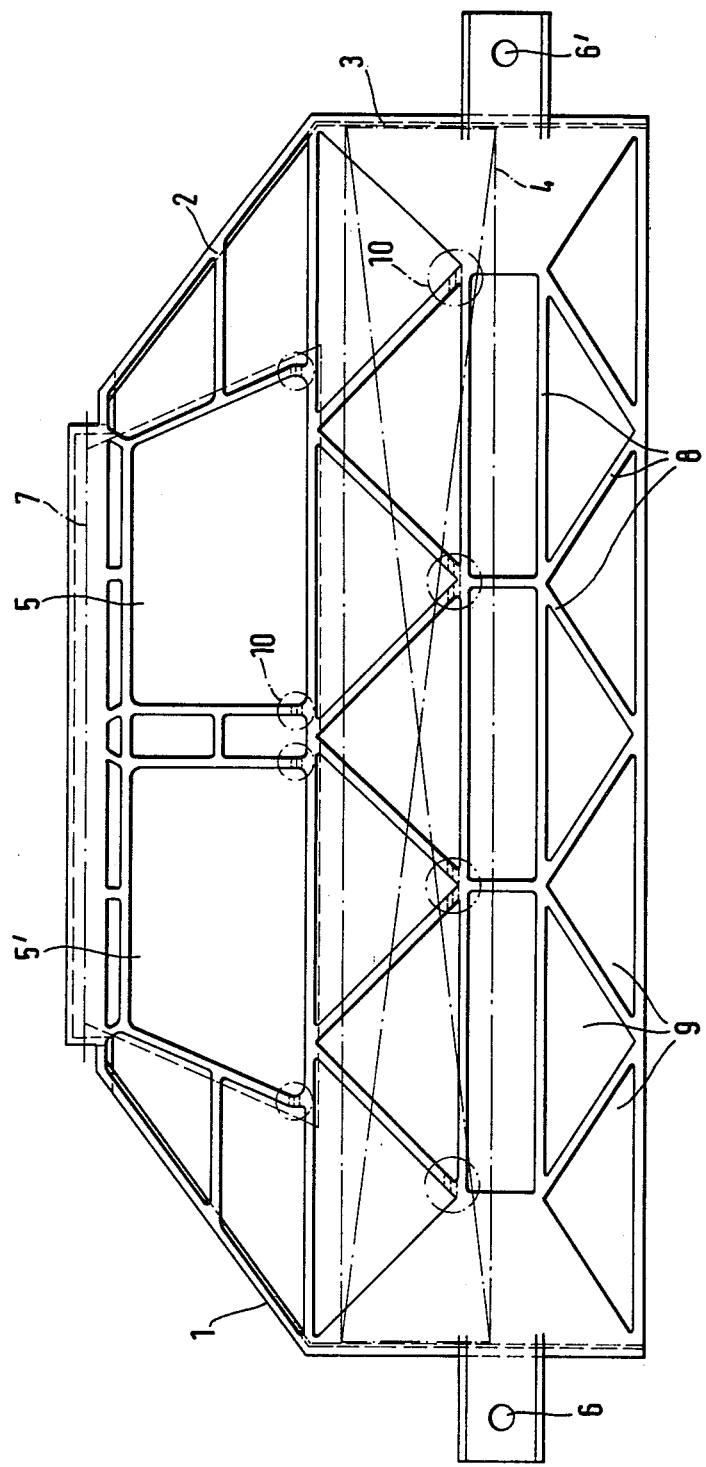
FIG. 1 is a front elevation view of the housing according to the invention.

According to the invention, the housing is comprised of a load-bearing lattice structure and a non-load-bearing skin enclosing the lattice structure. This structural design of the housing provides a structure which is statically highly determined, which renders the magnitude and direction of the forces acting upon the housing, and hence also the corresponding deformations, predeterminable. The non-load-bearing skin performs the function of sealing the housing outwardly and contributes in combination with the lattice structure to the light-weight construction of the housing.

According to an advantageous further embodiment of the invention, the lattice structure is stamped out from a sheet (e.g., sheet metal) and subsequently covered with a film, preferably a sheet of a synthetic plastic material. This results in a simple process for the manufacture of the lattice structure, which may be stamped from a flat sheet and subsequently assembled into the finished housing. This production method has the further advantage that the sections stamped out may be used as flaps for the heater housing.

Another advantageous embodiment of the invention provides for the injection molding of the entire housing from a plastic material, wherein the lattice rods are dimensioned heavier and perform the supporting function and thin sections of film are arranged between the lattice elements. These sections of film have no supporting function but serve only to seal the structure. This structural design may be advantageously produced with presently available plastic processing machines and has the advantage that the entire housing may be produced in a single working step.

A further advantageous embodiment of the invention provides in certain predetermined locations intentional points of fracture or hinges where the lattice structure and thus the entire housing collapses into itself in case of an impact, thus achieving the necessary shortening of the housing in the direction of the deformation. By means of this measure of the invention, the deformation of the housing may be predetermined with respect to its direction and extent.

An exemplary embodiment of the invention is represented in the drawings and will be explained hreinbelow in more detail.

Referring now to the drawings, in FIG. 1, the housing 1 of the invention is shown in a front elevation. The housing encloses in the known manner a heater 4, to which an evaporator, not shown, may be added. The housing 1 has a lattice structure 2 consisting of a plurality of angularly or diagonally arranged lattice bars 8. The lattice bars 8 enclose individual fields 9 which are sealed air tight by means of a skin 3, so that the entire housing 1, with the exception of its inlet and outlet orifices, which, for example, may be opened and closed by means of the flaps 5 and 5', respectively, represents a closed structure. In relation to the body of the vehicle, the housing 1 is supported at three points in a statically determined manner, namely, on the one hand, on the support axis 7, and on the other hand, at the two fastening points 6 and 6'. At the encircled points 10, intentional fracture points are provided; these are shown enlarged in FIG. 4.

FIG. 2 illustrates a bottom view of the housing according to the invention, where, for example, the air outlet flap may be located, which, together with the air inlet flaps 5 and 5', may be obtained in the form of finished parts during the stamping of the lattice structure from a sheet, for example, of metal.

FIG. 3 shows the housing of the invention in a side elevation, wherein the lattice structure according to the invention, comparable with trussing, is again visible. The arrow in the figure directed at the bottom side of the housing represents the possible direction of the deformation of the housing, which is supported on the axis of fastening 7 against the vehicle body. The housing is deformed against this fixed point 7 in case of an impact, i.e., when the engine pushes the housing before it, so that the housing assumes the contour shown by the broken lines. This indicates that the housing 1 is compressed in the manner of an accordion and will, therefore, not be pushed into the passenger compartment. This represents a significant contribution to the safety of the occupants of the vehicle.

FIG. 4 shows in an enlargement the intended points of fracture mentioned hereinabove, 10 and 10', respectively. These are formed by a cross-sectional weakening of the housing structure by means of a notch. The right-hand side of FIG. 4 shows a point of intended fracture in the unbuckled state, while the left-hand side displays two hingedly buckled points of intended fracture 10'.

FIG. 5 shows a partial section of the housing structure along the sectional plane B—B in FIG. 3. It is seen that the lattice structure 2 has a substantially larger cross-section than the fields of the outer skin which lie in-between. This embodiment may be produced preferably of a synthetic plastic material by the injection molding process and is thus particularly economical.

The present invention is preferably suited for use as a housing for a heating or cooling unit; however, it is by no means restricted to this application. On the contrary, the invention can advantageously find application also for fan housings and fan shrouds. In this regard, there is to be recognized the significant advantage of weight reduction for the fan housing which, for example, is connected to an automobile radiator.

The housings according to the invention can be manufactured from a wide variety of materials, preferably metals or a synthetic resinous material. Plastic materials offer the possibility of light-weight construction coupled with convenient one-step production, for example, by injection molding or thermal deformation processes. As plastic materials, there can be uses either a thermoplastic or a thermosetting polymer composition. For example, polypropylene represents a convenient and preferred thermoplastic material which is suitable for injection molding (e.g., the product HOSTALEN available from Hoechst AG) or a condensation polymer such as a polyester (e.g., POCAN available from Bayer AG) or an expoxy resin may be used, in which case a thermal deformation process is more suitable, e.g., thermal pressing.

What is claimed is:

1. A light-weight deformable air-conducting housing for use as a collapsing component in a vehicle, comprising:
    a load-bearing latice structure comprising a plurality of elongated members of a first thickness interconnected together in a rigid truss-like configuration having a predetermined axis of collapse and a plurality of open spaces between said elongated members;
    a non-load-bearing skin of a second thickness which is smaller than said first thickness of said elongated members, said skin closing in an airtight manner the open spaces between said elongated members and defining therein at least one air inlet and at least one air outlet;
    means on said housing for attaching said lattice structure to the body of a vehicle so that said predetermined axis of collapse of said housing coincides substantially with the longitudinal axis of the vehicle; and
    wherein said housing comprises a heater housing attached beneath the dashboard of a vehicle and contains a heater positioned therein.

2. A housing structure according to claim 1, wherein said lattice structure comprises a separate structure to which said skin is attached.

3. A housing structure according to claim 2, wherein said lattice structure is produced by stamping from a flat sheet.

4. A housing structure according to claim 1, wherein said lattice structure and said skin are integrally formed.

5. A housing structure according to claim 4, wherein said lattice structure and said skin are injection molded from a synthetic resinous material.

6. A housing structure according to claim 1, 2 or 4, wherein said lattice structure comprises a plurality of points of intended collapse comprising points of weakened cross-section at predetermined locations.

7. A housing structure according to claim 6, wherein said points of weakened cross-section comprise notches in the lattice structure.

* * * * *